(12) United States Patent
Ahn

(10) Patent No.: US 6,661,630 B1
(45) Date of Patent: Dec. 9, 2003

(54) DISTANCE RELAY FOR PROTECTION OF TRANSMISSION LINE HAVING MINIMIZED REACTANCE EFFECT

(75) Inventor: Yong Jin Ahn, 800-8, Dokdo-Ri, Kwangjuk-Myun, Yangjoo-Kun Kyungki-Do, 482-840 (KR)

(73) Assignees: Youho Electric Co. Ltd. (KR); Yong Jin Ahn (KR)

( * ) Notice: Subject to any disclaimer, the term of this patent is extended or adjusted under 35 U.S.C. 154(b) by 14 days.

(21) Appl. No.: 10/114,018

(22) Filed: Mar. 29, 2002

(51) Int. Cl.[7] ............................. H02H 3/26; H02H 7/26
(52) U.S. Cl. ............................. 361/80; 361/81; 361/78; 361/85
(58) Field of Search ............................. 361/80, 81, 85, 361/78, 79

(56) References Cited

U.S. PATENT DOCUMENTS

| | | | | |
|---|---|---|---|---|
| 4,433,353 A | * | 2/1984 | Wilkinson | 361/80 |
| 4,686,601 A | * | 8/1987 | Alexander et al. | 361/80 |
| 4,835,651 A | * | 5/1989 | Li et al. | 361/68 |
| 4,841,405 A | * | 6/1989 | Udren | 361/80 |
| 5,453,903 A | * | 9/1995 | Chow | 361/79 |
| 5,515,227 A | * | 5/1996 | Roberts et al. | 361/67 |

OTHER PUBLICATIONS

Aggarwal, R.K. et al., "A Practical Approach to Accurate Fault Location on Extra High Voltage Teed Feeders", IEEE Transactions on Power Delivery, vol. 8, No. 3, Jul. 1993, pp 874–883.

Wiszniewski, A., "Accurate fault impedance locating algorithm", IEEE Proceedings, vol. 130, Pt. C, No. 6, Nov. 1983, pp 311–314.

ZhiZhe, Z. et al., "An Adaptive Approach in Digital Protection", IEEE Transactions on Power Delivery, vol. 6, No. 1, Jan. 1991, pp 135–142.

Johns, A.T. et al., "Accurate Fault Location Technique for Power Transmission Lines", IEEE Proceedings, vol. 137, Pt. C, No. 6, Nov. 1990, pp 395–402.

\* cited by examiner

*Primary Examiner*—Bao Q. Vu
(74) *Attorney, Agent, or Firm*—Akerman Senterfitt

(57) ABSTRACT

A distance relay for protection of a transmission line, which is capable of estimating apparent impedances with respect to faults on the transmission line involving fault resistances, more particularly faults at local and remote ends of a protection zone of the transmission line, and compensating for the magnitudes and phases of the estimated apparent impedances, so as, to minimize a reactance effect resulting in a mal-operation or non-operation or the distance relay. If a fault occurs on the transmission line, the distance relay determines whether the amount of zero-sequence current resulting from overcurrent exceeds a predetermined threshold value, so as to determine whether the occurred fault is an earth fault or a short fault. The distance relay obtains an apparent fault location and a current distribution factor by calculating an apparent resistance and apparent reactance based on the earth fault or short fault, and then corrects an apparent impedance by calculating a phase angle from equations of the apparent impedance and a voltage at a location where the distance relay is installed. After correcting the apparent impedance, the distance relay determines whether a trip signal is required to be generated. If the trip signal generation is required, then the distance relay generates the trip signal.

5 Claims, 5 Drawing Sheets

DISTANCE RELAY FOR PROTECTION OF TRANSMISSION LINE HAVING MINIMIZED REACTANCE EFFECT

BACKGROUND OF THE INVENTION

1. Field of the Invention

The present invention relates to distance relays for protection of transmission lines, and more particularly to a distance relay for protection of a transmission line, which is capable of estimating apparent impedances with respect to faults on the transmission line involving fault resistances, more particularly faults at local and remote ends of a protection zone of the transmission line, and compensating for the magnitudes and phases of the estimated apparent impedances, so as to minimize a reactance effect resulting in a mal-operation or non-operation of the distance relay.

2. Description of the Related Art

In general terms, with power system being more complicated in construction, larger in size and higher in voltage, associated protection systems have also become very complicated in construction. In this regard, provided that such a protection system cannot display its appropriate protection ability with respect to a fault occurring at some part of an associated power system, the resulting accident ripple range and strength will be very great. If a protection relay bearing a primary responsibility does not accurately detect a fault occurring at any one part of a power system, a power interruption zone will be wider according to the rules of protection coordination. All backup protection relays for transmission lines and most main protection relays therefor are directional distance relays that are generally degraded in detection performance upon occurrence of a resistance earth fault. Further, as a transmission system becomes more complicated in construction, the average length of a transmission zone through which heavy load current flows is shortened, thereby causing a distance relay to perform a mal-operation or non operation due to a reactance effect which is a mutual coupling effect of a fault resistance and load current. Such a mal-operation or non-operation of a distance relay resulting from a reactance effect has recently been highlighted as a bigger problem.

SUMMARY OF THE INVENTION

Therefore, the present invention has been made in view of the above problems, and it is an object of the present invention to provide a distance relay for protection of a transmission line, which is capable of estimating an apparent impedance with respect to an accident on the transmission line involving a fault resistance, and compensating for the magnitude and phase of the estimated approximate impedance on the basis of a previously calculated current distribution factor, so as to minimize a mutual coupling effect of the fault resistance and a zero-sequence component and a load flow effect upon occurrence of a fault, thereby minimizing a reactance effect resulting in a mal-operation or non-operation of the distance relay.

In accordance with the present invention, the above and other objects can be accomplished by the provision of a method for controlling an operation of a distance relay for protection of a transmission line having a minimized reactance effect, the distance relay being adapted to, it a single-phase to earth fault or an phase to phase short fault occurs on the transmission line, calculate an apparent impedance, detect an apparent fault location as a result of the calculation and generate a trip signal if the detected apparent fault location belongs to a protection zone, the method comprising the steps of: a) receiving a voltage/current signal flowing through the transmission line; b) filtering the received signal; c) obtaining a power frequency component from the filtered signal; d) comparing a level of the obtained power frequency component with a first predetermined threshold value to determine whether it is greater than the first predetermined threshold value, so as to determine whether overcurrent flows through the transmission line; e) if the overcurrent is determined to flow through the transmission line at the step d), comparing the amount of zero-sequence current of the filtered signal with a second predetermined threshold value to determine whether it is greater than the second predetermined threshold value, so as to determine which one of the earth fault and short fault has occurred on the transmission line; f) if the amount of the zero-sequence current of the filtered signal is determined to be greater than the second predetermined threshold value at the step e), determining that the earth fault has occurred on the transmission line and calculating a first apparent resistance ($R_{app}$) and a first apparent reactance ($X_{app}$) of a first apparent impedance; g) obtaining a first apparent fault location on the basis of the first apparent reactance; h) calculating a zero-sequence current distribution factor ($CDF_{Sa0}$) at the first apparant fault location; i) calculating a first phase angle ($\alpha$) on the basis of the calculated zero-sequence current distribution factor; j) obtaining a first corrected impedance by correcting the first apparent impedance on the basis of the first phase angle; k) determining whether a difference between the first corrected impedance and the previous first apparent impedance is smaller than a third predetermined threshold value and returning to the step g) if the difference between the first corrected impedance and the previous first apparent impedance is determined not to be smaller than the third predetermined threshold value; l) if the amount of the zero-sequence current of the filtered signal is determined not to be greater than the second predetermined threshold value at the step e), determining that the short fault has occurred on the transmission line and calculating a second apparent resistance ($R_{app}$) and a second apparent reactance ($X_{app}$) of a second apparent impedance; m) obtaining a second apparent fault location on the basis of the second apparent reactance; n) calculating a positive-sequence current distribution factor ($CDF_{Sa1}$) at the second apparent fault location; o) calculating a second phase angle ($\alpha$) on the basis of the calculated positive-sequence current distribution factor; p) obtaining a second corrected impedance by correcting the second apparent impedance on the basis of the second phase angle; q) determining whether a difference between the second corrected impedance and a previous second apparent impedance is smaller than a fourth predetermined threshold value and returning to the step m) if the difference between the second corrected impedance and the previous second apparent impedance is determined not to be smaller than the fourth predetermined threshold value; r) determining whether the first or second corrected impedance belongs to the protection zone, if the difference between the first corrected impedance and the previous first apparent impedance is determined to be smaller than the third predetermined threshold value at the step k) or if the difference between the second corrected impedance and the previous second apparent impedance is determined to be smaller than the fourth predetermined threshold value at the step q); and s) returning to the step b) if it as determined at the step r) that the first or second corrected impedance does not belong to the protection zone, and generating the trip signal if it is determined at the step r) that the first or second corrected impedance belongs to the protection zone.

In a feature of the present invention, if a fault occurs on a transmission line, a distance relay determines whether the amount of zero-sequence current resulting from overcurrent exceeds a predetermined threshold value, so as to determine whether the occurred fault is an earth fault or a short fault. The distance relay obtains an apparent fault location and a current distribution factor by calculating an apparent resistance and reactance based on the earth fault or short fault, and then corrects an apparent impedance by calculating a phase angle from equations of the apparent impedance and a voltage at a location where the distance relay is installed. After correcting the apparent impedance, the distance relay determines whether a trip signal is required to be generated. If the trip signal generation is required, then the distance relay generates the trip signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
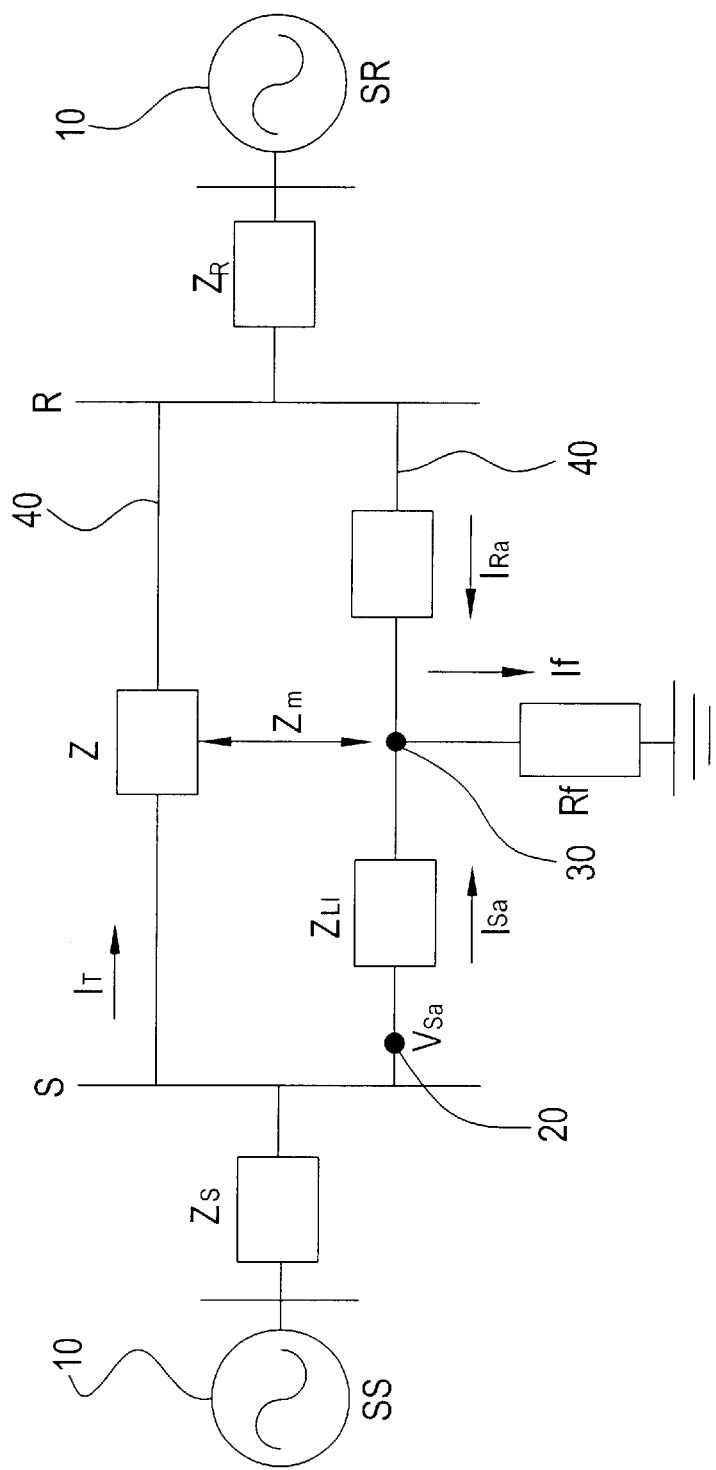
FIG. 1 is a view schematically showing a transmission line subject to a single phase to earth fault occurrence in accordance with the present invention.
Figure 2:
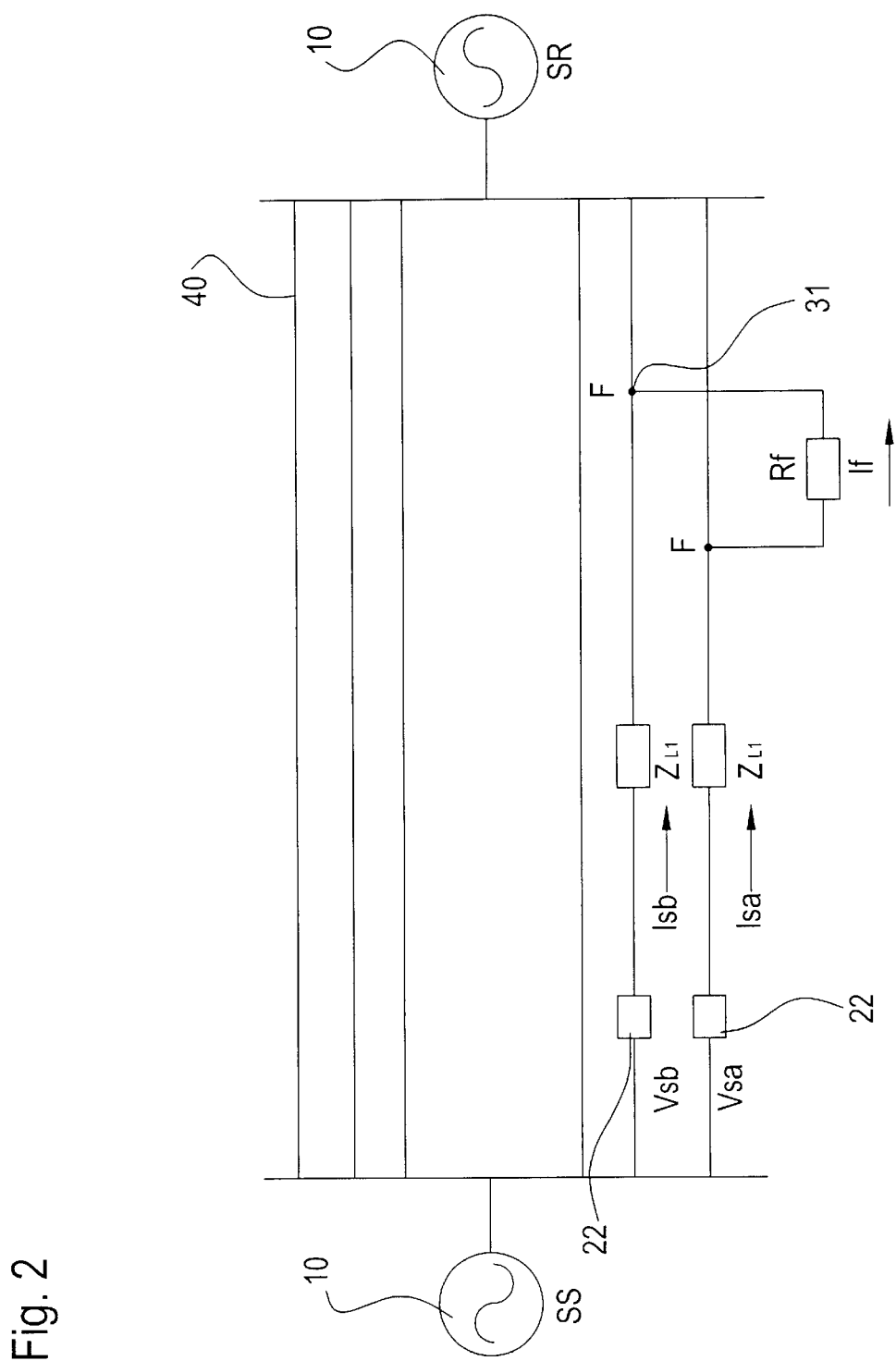
FIG. 2 is a view schematically showing a transmission line subject to a phase to phase short fault occurrence in accordance with the present invention.
Figure 3:
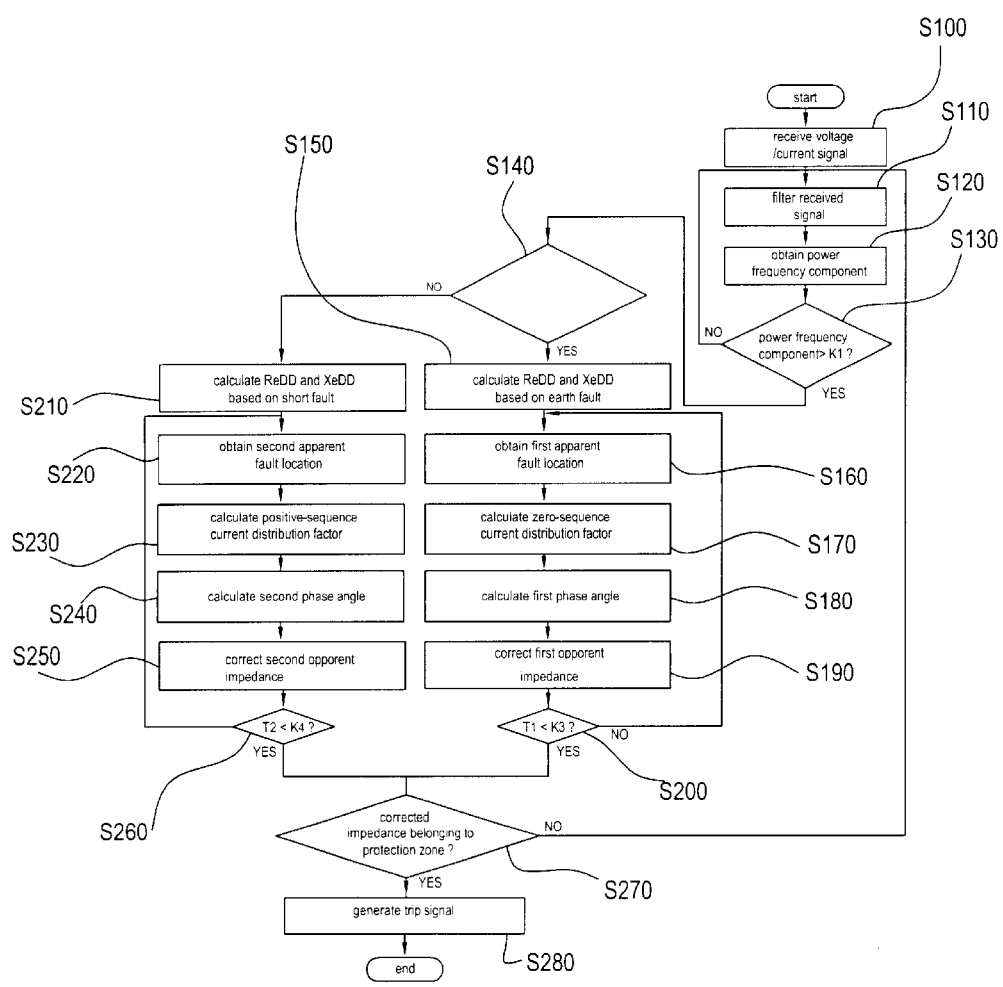
FIG. 3 is a flow chart schematically illustrating the operation of a distance relay for protecting a transmission line by minimizing a reactance effect in accordance with the present invention.
Figure 4:
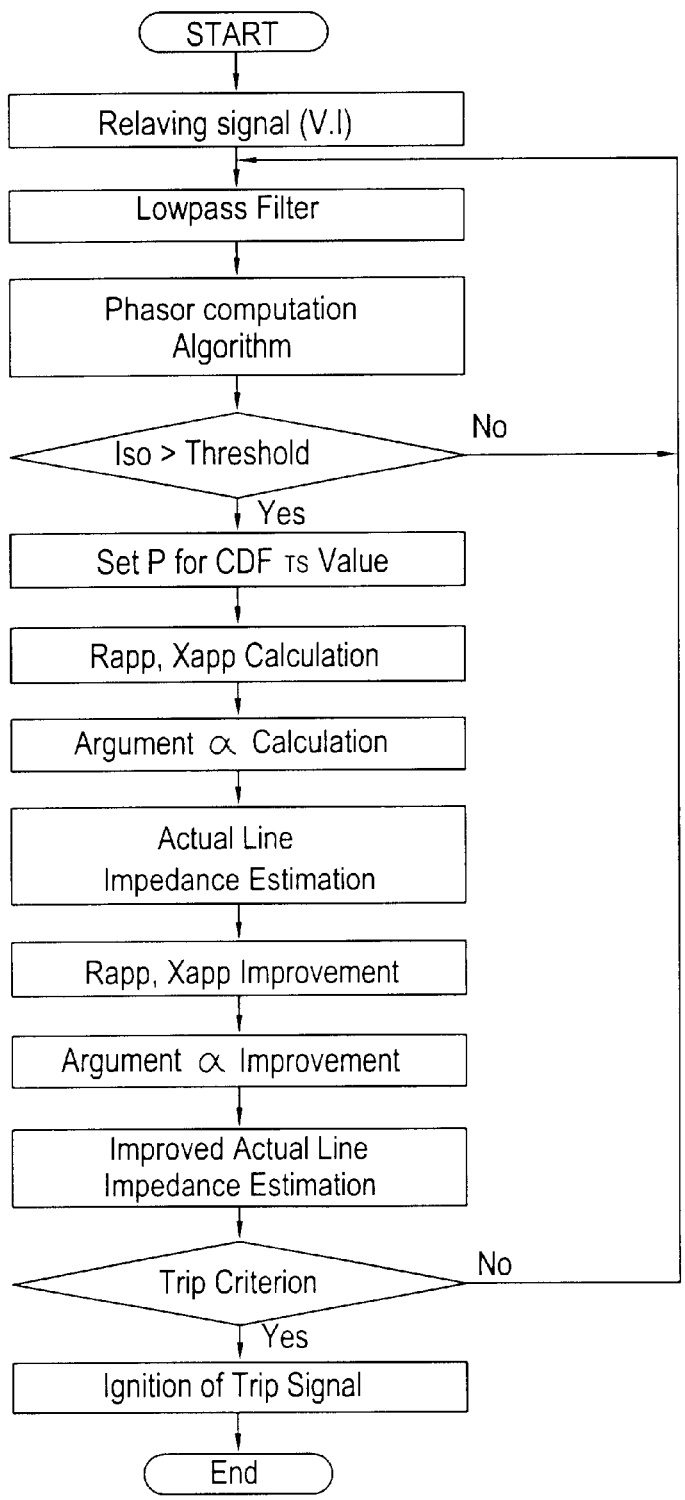
FIG. 4 is a flow chart schematically showing one embodiment of the relaying algorithm for single phase to ground faults in accordance with the present invention.
Figure 5:
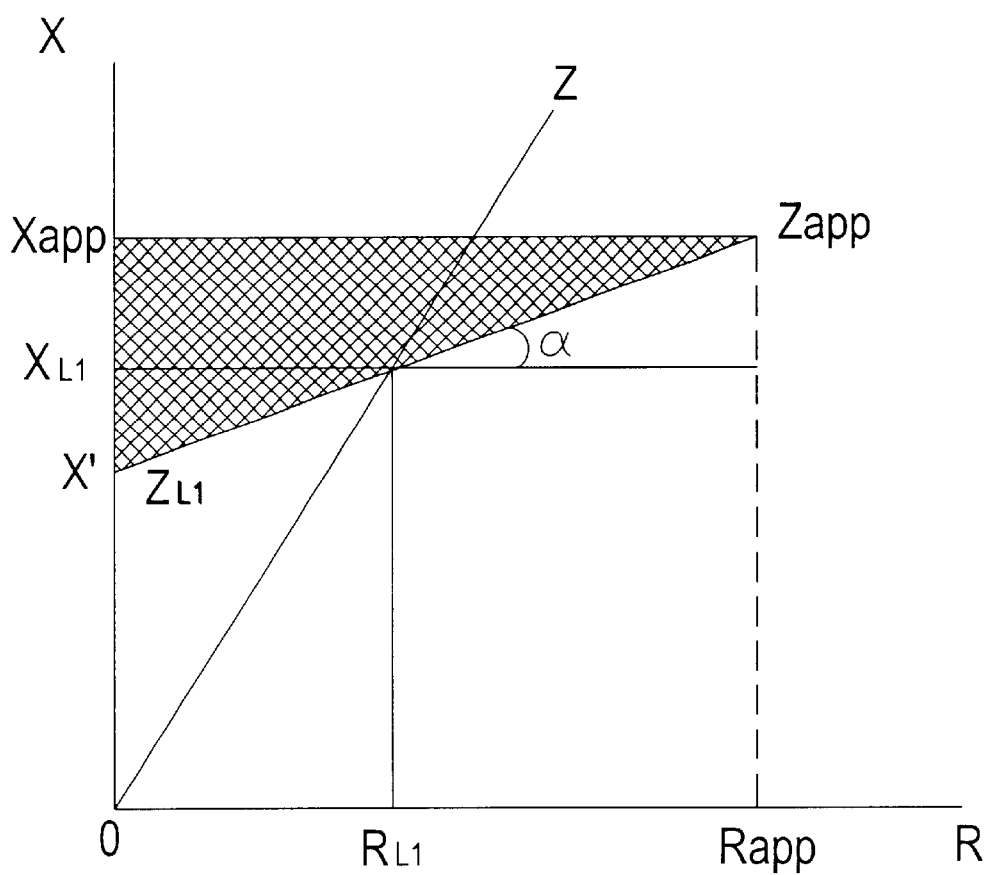
FIG. 5 is a view schematically showing a correction of impedance in accordance with the present invention.

FIG. 1 is a view schematically showing a transmission line subject to a single phase to earth fault occurrence in accordance with the present invention, FIG. 2 is a view schematically showing a transmission line subject to a phase to phase short fault occurrence in accordance with the present invention, FIG. 3 is a flow chart schematically illustrating the operation of a distance relay for protecting a transmission line by minimizing a reactance effect in accordance with the present invention, FIG. 4 is a flow chart schematically showing one embodiment of the relaying algorithm for single phase to ground faults in accordance with the present invention, and FIG. 5 is a view schematically showing a correction of impedance in accordance with the present invention.

With reference to FIGS. 1 and 2, first, if a fault occurs on a transmission line 40, a distance relay 20 or 22 determines whether a sensed fault location belongs to a self-protection zone, and generates a trip signal upon determining that the sensed fault location belongs to the self-protection zone.

In the case where the occurred fault is a single phase to earth fault, a voltage $V_{Sa}$ generally sensed at a location where the distance relay 20 in installed can be expressed by the following equation 10:

$$V_{Sa} = Z_{LI}\left(I_{Sa} + \frac{Z_{L0} - Z_{LI}}{Z_{LI}} I_{S0} + \frac{Z_m}{Z_{LI}} I_{T0}\right) + R_f I_j \quad \text{[Equation 10]}$$

In the above equation 10, $R_f I_f$ is an error of a voltage sensed based on a fault resistance.

An apparent impedance that the distance relay 20 estimates with respect to the single phase to earth fault can be expressed as in the following equation 11:

$$Z_{app} = R_{app} + jX_{app} = \frac{V_{app}}{I_{app}} \text{ where,} \quad \text{[Equation 11]}$$

$$V_{app} = V_{Sa}$$

$$I_{app} = I_{Sa} + \frac{Z_{L0} - Z_{LI}}{Z_{LI}} I_{S0} + \frac{Z_m}{Z_{LI}} I_{T0}$$

In the above equation 11, $I_{T0}$ is a current value that the distance relay 20 can detect from a normal circuit. If $I_{T0}$ cannot be detected by the distance relay 20, it may be obtained from $$I_{T0} = \frac{I_{S0}}{CDF_{TS}}.$$

In order to obtain a phase angle for verification of an error included in the estimated apparent impedance, the following equation 12 can be derived from the above equation 10 and equation 11 to represent the relation between the apparent impedance and the actual impedance:

$$Z_{app} = Z_{LI} + R_f \frac{3I_{f0}}{I_{S0} + \frac{Z_{L0} - Z_{LI}}{Z_{LI}} I_{S0} + \frac{Z_m}{Z_{LI}} I_{T0}} \quad \text{[Equaiton 12]}$$

$$= Z_{LI} + R_f \left| \frac{3I_{f0}}{I_{S0} + \frac{Z_{L0} - Z_{LI}}{Z_{LI}} I_{S0} + \frac{Z_m}{Z_{LI}} I_{T0}} \right| e^{j\alpha}$$

As seen from the above equation 12, the apparent impedance estimated by the distance relay 20 is influenced by a fault resistance $R_f$, a zero-sequence mutual impedance $Z_m$, and zero-sequence current $I_{T0}$ of the normal circuit, as well an the actual impedance $Z_{L1}$, to the fault location. As a result, it can be seen that the estimated apparent impedance has an error corresponding to a term including the fault resistance $R_f$, other than the actual impedance $Z_{L1}$.

Accordingly, a phase angle $\alpha$ can be obtained through the below equation 13 by estimating the zero-sequence current of the normal circuit and zero-sequence current of the fault location from the above equation 12 on the basis of a zero-sequence current distribution factor faulty-circuit and zero-sequence current of a normal-circuit:

$$\alpha = Arg\left(\frac{I_{f0}}{I_{S0} + \frac{Z_{L0} - Z_{LI}}{Z_{LI}} I_{S0} + \frac{Z_m}{Z_{LI}} I_{T0}}\right) \quad \text{[Equation 13]}$$

$$= Arg\left(\frac{I_{S0}/CDF_{Sa0}}{I_{S0} + \frac{Z_{L0} - Z_{LI}}{Z_{LI}} I_{S0} + \frac{Z_m}{Z_{LI}} \frac{I_{S0}}{CDF_{TS}}}\right)$$

$$= Arg\left(\frac{I_{S0}}{I_{S0} + \frac{Z_{L0} - Z_{L1}}{Z_{L1}}I_{S0} + \frac{Z_m}{Z_{L1}}\frac{I_{S0}}{CDF_{TS}}}\right) +$$

$$Arg\left(\frac{1}{CDF_{Sa0}}\right)$$

In the above equation 13, because the zero-sequence current $I_{f0}$ of the fault location is an unknown value, it can be expressed by the zero-sequence current $I_{S0}$ and zero-sequence current distribution factor $CDF_{Sa0}$ of a faulty circuit. Alternatively, in the case where the zero-sequence current $I_{f0}$ of the normal circuit is estimated and used, the zero-sequence current $I_{f0}$, of the fault location can be expressed by the zero-sequence current $I_{S0}$ of the faulty-circuit and zero-sequence current distribution factor $CDF_{TS}$ of the faulty-circuit. As a result, the phase angle α can be obtained from the zero-sequence current $I_{f0}$ of the fault location.

The zero-sequence current of the adjacent (healthy) parallel circuit, $I_{T0}$, and the zero-sequence fault current, $I_{f0}$, can be estimated with only the local end relaying signals of the faulted circuit. Hence, two current distribution factors obtained from the system configuration after a fault are used to estimate the two unknown current variables. $I_{T0}$ and $I_{f0}$ can be expressed by the local end zero-sequence current of the faulted circuit, $I_{S0}$, and the current distribution factor $CDF_{TS}$ and $CDF_{Sa0}$.

The zero-sequence current distribution factor to estimate the fault current at a fault point, $CDF_{Sa0}$, is the ratio of the zero-sequence current at local end of the faulted circuit to the zero-sequence fault current at the fault point.

The zero-sequence current distribution factor $CDF_{Sa0}$ of the fault circuit can be calculated as in the below equation 14:

$$CDF_{Sa0} = \frac{I_{S0}}{I_{f0}} = \frac{pB_{Sa0} + C_{Sa0}}{A_{Sa0}} \quad \text{[Equation 14]}$$

where, $A_{Sa0}=(Z_{L0}-Z_m)(Z_{S0}+Z_{R0}+Z_m)+(Z_{T0}-Z_m)(Z_{S0}+Z_{R0}+Z_{L0})$ $B_{Sa0}=(Z_m-Z_{L0})(Z_{S0}+Z_{R0}+Z_m)-(Z_{T0}-Z_m)Z_{L0}$ $C_{Sa0}=(Z_{L0}-Z_m)(Z_{S0}+Z_{R0}+Z_m)+(Z_{T0}-Z_m)(Z_{R0}+Z_{L0})$ The zero-sequence current distribution factor to estimate the zero-sequence current of the adjacent healthy parallel circuit, $CDF_{TS}$, is the ratio of the zero-sequence current at local end of the faulted circuit to the zero-sequence current at local end of the healthy circuit. $P$ The $P$ is fault location.

The zero-sequence current distribution factor $CDF_{TS}$ of the faulty-circuit can be calculated as in the below equation $$CFD_{TS} = \frac{I_{S0}}{I_{T0}} = \frac{pA_{ST} + B_{ST}}{pC_{ST} + D_{ST}} \quad \text{[Equation 15]}$$

where, $A_{ST}=(Z_m-Z_{L0})(Z_{S0}+Z_{R0}+Z_m)-(Z_{T0}-Z_m)Z_{L0}$ $B_{ST}=(Z_{L0}-Z_m)(Z_{S0}+Z_{R0}+Z_m)+(Z_{T0}-Z_m)(Z_{R0}+Z_{L0})$ $C_{ST}=(Z_{L0}-Z_m)(Z_{S0}+Z_{R0})$ $D_{ST}=(Z_m-Z_{L0})Z_{S0}$ On the other hand, in the case where the occurred fault is a phase to phase short fault, a voltage $V_{Sab}$ generally sensed at a location where the distance relay 22 is installed can be expressed by the following equation 20:

$$V_{Sab}=V_{Sa}-V_{Sb}=Z_{L1}(I_{Sa}-I_{Sb})+R_fI_f \quad \text{[Equation 20]}$$

In the above equation 20, $R_fI_f$ is an error of a voltage sensed based on a fault resistance, as in the above equation 10.

An apparent impedance that the distance relay 22 estimates with respect to the phase to phase short fault can be expressed as in the following equation 21:

$$Z_{app} = R_{app} + jX_{app} = \frac{V_{Sa} - V_{Sb}}{I_{Sa} - I_{Sb}} \quad \text{[Equation 21]}$$

The following equation 22 can be derived from the above equation 20 and equation 21 to represent the relation between the estimated apparent impedance and the actual impedance:

$$Z_{app} = Z_{L1} + R_f\frac{I_f}{I_{Sa} - I_{Sb}} \quad \text{[Equation 22]}$$

$$= Z_{L1} + R_f\left|\frac{I_f}{I_{Sa} - I_{Sb}}\right|e^{j\alpha}$$

As seen from the above equation 22, the apparent impedance estimated by the distance relay 22 is influenced by a fault resistance $R_f$ and fault location current $I_f$, as well as the actual impedance $Z_{L1}$ to the fault location. As a result, it can be seen that the estimated apparent impedance has an error corresponding to a term including the fault resistance $R_f$, other than the actual impedance $Z_{L1}$.

Therefore, a phase angle α can be obtained through the below equation 23 by estimating the fault location current $I_f$ from the above equation 22 on the basis of current of a faulty-circuit:

$$\alpha = Arg\left(\frac{I_f}{I_{Sa} - I_{Sb}}\right) \quad \text{[Equation 23]}$$

$$= Arg\left(\frac{1}{I_{Sa} - I_{Sb}}\frac{I_{Saf} - I_{Sbf}}{CDF1_{Sa1}}\right)$$

$$= Arg\left(\frac{I_{Saf} - I_{Sbf}}{I_{Sa} - I_{Sb}}\right) + Arg\left(\frac{1}{CDF_{Sa1}}\right)$$

where, $I_{S0}=I_{SaL}+I_{Saf}$ $I_{SD}=I_{SDL}+I_{SDf}$ $I_{SaL}$: a-phase load current at the distance relay installed location $I_{SbL}$: b-phase load current at the distance relay installed location $I_{Saf}$: a-phase pure fault current at the distance relay installed location $I_{Sbf}$: b-phase pure fault current at the distance relay installed location In the above equation 23, because the fault location current $I_f$ is an unknown value, it can be expressed by the pure fault currents $I_{Saf}$ and $I_{Sbf}$ of the faulty-circuit and positive-sequence current distribution factor $CDF_{Sa1}$. As a result, the phase angle α can be obtained by first calculating the positive-sequence current distribution factor $CDF_{Sa1}$.

In the above equation 23, the faulty-circuit/positive-sequence current distribution factor $CDF_{Sa1}$ can be obtained through the below equation 24:

$$CDF_{Sa1} = \frac{I_{S1}}{I_{f1}} = \frac{pB_{Sa1} + C_{Sa1}}{A_{Sa1}} \quad \text{[Equation 24]}$$

where, $A_{Sa1} = Z_{L1}(Z_{S1}+Z_{R1}) + Z_{T1}(Z_{S1}+Z_{R1}+Z_{L1})$ $B_{Sa1} = Z_{L1}(Z_{S1}+Z_{R1}+Z_{T1})$ $C_{Sa1} = Z_{L1}(Z_{S1}+Z_{R1}+Z_{T1}) + (Z_{T1})(Z_{R1})$ With reference to FIG. 3, at a signal reception step S100, the distance relay 20 or 22 receives a voltage/current signal $V_{Sa}$ or $V_{Sb}$ flowing through the transmission line 40 at its installed location.

At a filtering step S100, a low pass filter (not shown) filters the signal received at the signal reception step S100. At a phasor calculation step S120, a power frequency component is obtained from the signal filtered at the filtering step S100. At an overcurrent determination step S130, the level of the power frequency component obtained at the phasor calculation step S120 is compared with a predetermined threshold value K1 to make a determination as to whether it is greater than the predetermined threshold value K1, namely, whether overcurrent flows through the transmission line. If the overcurrent is determined to flow through the transmission line at the overcurrent determination step S130, the amount of zero-sequence current of the filtered signal is compared with a predetermined threshold value K2 at an earth fault/short fault determination step S140 to make a determination as to whether it is greater than the predetermined threshold value K2, namely, whether an earth fault or a short fault has occurred on the transmission line. In the case where the amount of the zero-sequence current of the filtered signal is determined to be greater than the predetermined threshold value K2 at the earth fault/short fault determination step S140, it is determined that the earth fault has occurred on the transmission line, and a first apparent resistance $R_{app}$ and a first apparent reactance $X_{app}$ of a first apparent impedance are then calculated at a first apparent impedance calculation step S150.

The first apparent resistance $R_{app}$ and first apparent reactance $X_{app}$ can be obtained from the equation 11:

$$Z_{app} = R_{app} + jX_{app} = \frac{V_{app}}{I_{app}} \quad \text{[Equation 11]}$$

After the first apparent impedance calculation step S150 is performed, a first apparent fault location p is obtained at a first apparent fault location calculation step S160 by dividing the first approximate reactance $X_{app}$ by the total reactance of the transmission line, namely, $$p = \frac{X_{app}}{X_{Total}},$$

where $X_{Total}$ is the total reactance of the transmission line.

After the first apparent fault location calculation step S160 in performed, a zero-sequence current distribution factor $CDF_{Sa0}$ at the first apparent fault location p is calculated at a zero-sequences current distribution factor calculation step S170. The zero-sequence current distribution factor $CDF_{Sa0}$ can be obtained from the equation 14:

$$CDF_{Sa0} = \frac{I_{S0}}{I_{f0}} = \frac{pB_{Sa0} + C_{Sa0}}{A_{Sa0}} \quad \text{[Equation 14]}$$

After the zero-sequence circuit distribution factor calculation step S170 is performed, a first phase angle α is calculated at a first phase angle calculation step S180. The first phase angle α can be obtained from tan equation 13:

$$\alpha = Arg\left(\frac{I_{f0}}{I_{S0} + \frac{Z_{L0} - Z_{L1}}{Z_{L1}}I_{S0} + \frac{Z_m}{Z_{L1}}I_{f0}}\right) \quad \text{[Equation 13]}$$

$$= Arg\left(\frac{I_{S0}/CDF_{Sa0}}{I_{S0} + \frac{Z_{L0} - Z_{L1}}{Z_{L1}}I_{S0} + \frac{Z_m}{Z_{L1}}\frac{I_{S0}}{CDF_{TS}}}\right)$$

$$= Arg\left(\frac{I_{S0}/CDF_{Sa0}}{I_{S0} + \frac{Z_{L0} - Z_{L1}}{Z_{L1}}I_{S0} + \frac{Z_m}{Z_{L1}}\frac{I_{S0}}{CDF_{TS}}}\right) +$$

$$Arg\left(\frac{1}{CDF_{Sa0}}\right)$$

After the first phase angle calculation step S180 is performed, a first corrected impedance is obtained at a first impedance correction step S190 by correcting the first apparent impedance on the basis of the first phase angle α. Here, a reactance for correction of the first apparent impedance can be calculated as in the following equation 25:

$$X' = X_{app} \pm R_{app} \cdot \tan\alpha \quad \text{[Equation 25]}$$

Correcting the first apparent impedance on the basis of the reactance (X') obtained from the above equation 25, a corrected resistance $R_{L1}$ and a corrected reactance $X_{L1}$ of the corrected impedance can be obtained as in tho below equation 26:

$$R_{L1} = \frac{X'}{X/R - (X_{app} - X')/R_{app}} \quad \text{[Equation 26]}$$

$$X_{L1} = \frac{X}{R} \cdot \frac{X'}{X/R - (X_{app} - X')/R_{app}}$$

where, R: resistance per unit length of the transmission line (Ω/km)

X: reactance per unit length of the transmission line (Ω/km)

After the first impedance correction step S190 is performed, a determination is made at a first loop execution determination step S200 as to whether a difference T1 between the first corrected impedance and a previous first apparent impedance is smaller than a predetermined threshold value K3. If the difference T1 is determined not to be smaller than the predetermined threshold value K3 at the first loop execution determination step S200, the operation of the distance relay returns to the above first apparent fault location calculation step S160. Alternatively, in the case where the difference T1 is determined to be smaller than the predetermined threshold value K3 at the first loop execution determination step S200, the operation of the distance relay proceeds to a trip signal determination step S270.

On the other hand, in the case where the amount of the zero-sequence current of the filtered signal is determined not to be greater than the predetermined threshold value K2 at the above earth fault/short fault determination step S140, it is determined that the short fault has occurred on the transmission line, and a second apparent resistance $R_{app}$ and a second apparent reactance $X_{app}$ of a second apparent impedance are then calculated at a second apparent impedance calculation step S210.

The second apparent resistance $R_{app}$ and second apparent reactance $X_{app}$ can be obtained from the equation 21:

$$Z_{app} = R_{app} + jX_{app} = \frac{V_{Sa} - V_{Sb}}{I_{So} - I_{Sb}} \quad \text{[Equation 21]}$$

After the second apparent impedance calculation step S210 is performed, a second apparent fault location p is obtained at a second apparent fault location calculation step S220 by dividing the second apparent reactance $X_{app}$ by the total reactance of the transmission line, namely, $$p = \frac{X_{app}}{X_{Total}},$$

where $X_{Total}$ is the total reactance of the transmission line.

After the second apparent fault location calculation step S220 is performed, a positive-sequence current distribution factor $CDF_{Sa1}$ at the second apparent fault location p is calculated at a positive-sequence current distribution factor calculation step S230. The positive-sequence current distribution factor $CDF_{Sa1}$ can be obtained from the equation 24:

$$CDF_{Sa1} = \frac{I_{S1}}{I_{f1}} = \frac{pB_{Sa1} + C_{Sa1}}{A_{Sa1}} \quad \text{[Equation 24]}$$

After the positive-sequence current distribution factor calculation stop S230 is performed, a second phase angle α is calculated at a second phase angle calculation step S240. The second phase angle α can be obtained from the equation 23:

$$a = Arg\left(\frac{I_f}{I_{So} - I_{So}}\right) \quad \text{[Equation 23]}$$
$$= Arg\left(\frac{1}{I_{Sa} - I_{Sb}} \cdot \frac{I_{Saf} - I_{Sbf}}{CDFI_{Sa1}}\right)$$
$$= Arg\left(\frac{I_{Saf} - I_{Sbf}}{I_{Sa} - I_{Sb}}\right) + Arg\left(\frac{1}{CDF_{Sa1}}\right)$$

After the second phase angle calculation step S240 is performed, a second corrected impedance is obtained at a second impedance correction step S250 by correcting the second apparent impedance on the basis of the second phase angle α. Here, a reactance for correction of the second apparent impedance can be calculated as in the following equation 25:

$$X' = X_{app} \pm R_{app} \cdot \tan\alpha \quad \text{[Equation 25]}$$

Correcting the second apparent impedance on the basis of the reactance obtained from the above equation 25, a corrected resistance $R_{L1}$ and a corrected reactance $X_{L1}$ of the corrected impedance can be obtained as in the following equation 26:

$$R_{L1} = \frac{X'}{X/R - (X_{app} - X')/R_{app}} \quad \text{[Equation 26]}$$

$$X_{L1} = \frac{X}{R} \cdot \frac{X'}{X/R - (X_{app} - X')/R_{app}}$$

where, R: resistance per unit length of the transmission line (Ω/km)

X: reactance per unit length of the transmission lines (Ω/km)

After the second impedance correction step S250 is performed, a determination is made at a second loop execution determination step S260 as to whether a difference T2 between the second corrected impedance and a previous second apparent impedance is smaller than a predetermined threshold value K4. In the case where the difference T2 is determined not to be smaller than the predetermined threshold value K4 at the second loop execution determination step S260, the operation of the distance relay returns to the above second apparent fault location calculation step S220. Alternatively, in the case where the difference T2 is determined to be smaller than the predetermined threshold value K4 at the second loop execution determination step S260, the operation of the distance relay proceeds to the trip signal determination step S270.

In the case where the difference T1 is determined to be smaller than the predetermined threshold value K3 at the above first loop execution determination step S200 or the difference T2 is determined to be smaller than the predetermined threshold value K4 at the above second loop execution determination step S260, a determination is made at the trip signal determination step S270 as to whether the first or second corrected impedance ($R_{L1}$, $X_{L1}$) belongs to a self-protection zone of the distance relay 20 or 22, namely, whether a trip signal is required to be generated. If it is determined at the trip signal determination step S270 that the corrected impedance ($R_{L1}$, $X_{L1}$) does not belong to the self-protection zone of the distance relay 20 or 22, the operation of the distance relay returns to the above filtering step S110 because the trip signal need not be generated. On the contrary, in the case where it is determined at the trip signal determination step S270 that the corrected impedance ($R_{L1}$, $X_{L1}$) belongs to the self-protection zone of the distance relay 20 or 22, the operation of the distance relay proceeds to a trip signal generation step S280 to generate the trip signal to a circuit breaker (not shown).

With reference to FIG. 4, the relaying algorithm is performed through following steps. In order to compute the apparent impedance, the current distribution factor, $CDF_{TS}$, is calculated after setting the initial value of the fault distance to 0.8 (pu). Because distance relays must have high performance of selectivity at the faults near the remote end, 0.8 (pu) is selected for the initial value. Next, the apparent impedance is calculated and the actual value of the line impedance to a fault is estimated. The estimated line impedance value has an error because it wag calculated with the predetermined initial value of the fault distance, 0.8 (pu). To reduce this error, new apparent impedance is estimated with the estimated fault distance at the previous step. With this new apparent impedance, the actual line impedance to a fault is estimated again. This improvement process is performed just once in this paper. If, however, the improvement process is performed recursively several times, the estimated line impedance will be more accurate.

As apparent from the above description, according to the present invention, if a fault occurs on a transmission line, a distance relay determines whether the amount of zero-sequence current resulting from overcurrent exceeds a predetermined threshold value, so as to determine whether the occurred fault is an earth fault or a short fault. The distance relay obtains an apparent fault location and a current distribution factor by calculating an apparent resistance and apparent reactance based on the earth fault or short fault, and then correct an apparent impedance by calculating a phase angle from equations of the apparent impedance and a voltage at a location where the distance relay is installed. After correcting the apparent impedance, the distance relay determines whether a trip signal is required to be generated. If the trip signal generation is required, then the distance relay generates the trip signal to a circuit breaker. In response to the trip signal from the distance relay, the circuit breaker is rapidly driven to separate a fault zone from a normal system, thereby preventing the occurred fault from having a ripple effect the entire power system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling an operation of a distance relay for protection of a transmission line having a minimized reactance effect, said distance relay being adapted to, if a single phase to earth fault or a phase to phase short fault occurs on said transmission line, calculate an apparent impedance, detect an apparent fault location as a result of the calculation and generate a trip signal if the detected apparent fault location belongs to a protection zone, said method comprising the steps of:

a) receiving a voltage/current signal flowing through said transmission line;
   b) filtering the received signal;
   c) obtaining a power frequency component from the filtered signal;
   d) comparing a level of the obtained power frequency component with a first predetermined threshold value to determine whether it is greater than said first predetermined threshold value, so as to determine whether overcurrent flows through said transmission line;
   e) if the overcurrent is determined to flow through said transmission line at said step d), comparing the amount of zero-sequence current of said filtered signal with a second predetermined threshold value to determine whether it is greater than said second predetermined threshold value, so as to determine which one of said earth fault and short fault has occurred on said transmission line;
   f) if the amount of said zero-sequence current of said filtered signal is determined to be greater than said second predetermined threshold value at said step e), determining that said earth fault has occurred on said transmission line and calculating a first apparent resistance ($R_{app}$) and a first apparent reactance ($X_{app}$) of a first apparent impedance;
   g) obtaining a first apparent fault location on the basis of said first apparent reactance;
   h) calculating a zero-sequence current distribution factor ($CDF_{Sa0}$) at said first apparent fault location;
   i) calculating a first phase angle ($\alpha$) on the basis of the calculated zero-sequence current distribution factor;
   j) obtaining a first corrected impedance by correcting said first apparent impedance on the basis of said first phase angle;
   k) determining whether a difference between said first corrected impedance and a previous first apparent impedance is smaller than a third predetermined threshold value and returning to said step g) if the difference between said first corrected impedance and said previous first apparent impedance is determined not to be smaller than said third predetermined threshold value;
   l) if the amount of said zero-sequence current of said filtered signal is determined not to be greater than said second predetermined threshold value at said step e), determining that said short fault has occurred on said transmission line and calculating a second apparent resistance ($R_{app}$) and a second apparent reactance ($X_{app}$) of a second apparent impedance;
   m) obtaining a second apparent fault location on the basis of said second apparent reactance;
   n) calculating a positive-sequence current distribution factor ($CDF_{Sa1}$) at said second apparent fault location;
   o) calculating a second phase angle ($\alpha$) on the basis of the calculated positive-sequence current distribution factor;
   p) obtaining a second corrected impedance by correcting said second apparent impedance on the basic of said second phase angle;
   q) determining whether a difference between said second corrected impedance and a previous second apparent impedance is smaller than a fourth predetermined threshold value and returning to said step m) if the difference between said second corrected impedance and said previous second apparent impedance is determined not to be smaller than said fourth predetermined threshold value;
   r) determining whether said first or second corrected impedance belongs to said protection zone, if said difference between said first corrected impedance and said previous first apparent impedance is determined to be smaller than said third predetermined threshold value at said step k) or if said difference between said second corrected impedance and said previous second apparent impedance is determined to be smaller than said fourth predetermined threshold value at said step q); and
   s) returning to said step b) if it is determined at said step r) that said first or second corrected impedance does not belong to said protection zone, and generating said trip signal if it is determined at said step r) that said first or second corrected impedance belongs to said protection zone.

2. The method as set forth in claim 1, wherein said step i) includes the step of calculating said first phase angle ($\alpha$) on the basis of the below equation:

$$\alpha = Arg\left(\frac{I_{f0}}{I_{Sa} + \frac{Z_{L0} - Z_{L1}}{Z_{L1}} I_{S0} + \frac{Z_m}{Z_{L1}} I_{T0}}\right)$$

$$= Arg\left(\frac{I_{S0}/CDF_{Sa0}}{I_{Sa} + \frac{Z_{L0} - Z_{L1}}{Z_{L1}} I_{S0} + \frac{Z_m}{Z_{L1}} \frac{I_{S0}}{CDF_{TS}}}\right)$$

$$= Arg\left(\frac{I_{S0}}{I_{Sa} + \frac{Z_{L0} - Z_{L1}}{Z_{L1}}I_{S0} + \frac{Z_m}{Z_{L1}}\frac{I_{S0}}{CDF_{TS}}}\right) + Arg\left(\frac{1}{CDF_{Sa0}}\right)$$

3. The method as set forth in claim 1, wherein said step o) includes the step of calculating said second phase angle ($\alpha$) on the basis of the below equation:

$$\alpha = Arg\left(\frac{I_f}{I_{Sa} - I_{Sb}}\right)$$
$$= Arg\left(\frac{1}{I_{Sa} - I_{Sb}}\frac{I_{Saf} - I_{Sbf}}{CDFI_{Sa1}}\right)$$
$$= Arg\left(\frac{I_{Saf} - I_{Sbf}}{I_{Sa} - I_{Sb}}\right) + Arg\left(\frac{1}{CDF_{Sa1}}\right)$$

4. The method as set forth in claim 1, wherein each of said steps j and p includes the step of calculating a reactance for correction of each of said first and second apparent impedances on the basis of the below equation:

$$X' = X_{app} \pm R_{app} \cdot \tan \alpha$$

5. The method as set forth in claim 1, wherein each of said step j and p includes the step of calculating a corrected resistance ($R_{L1}$) and a corrected reactance ($X_{L1}$) of each of said first and second corrected impedances on the basis of the below equation:

$$I_{Sa} = I_{SaL} + I_{Saf}|'||'|$$

$$R_{L1} = \frac{X'}{X/R - (X_{app} - X')/R_{app}}$$

$$X_{L1} = \frac{x}{R} \cdot \frac{X'}{X/R - (X_{app} - X')/R_{app}}.$$

* * * * *